United States Patent Office 3,413,245

Patented Nov. 26, 1968

3,413,245

PROCESS FOR RENDERING POLYURETHANE FOAMS HYDROPHILIC BY REACTING SAME WITH A LACTONE

Joerg Sambeth and Alexis Archipoff, both of Carouge, Switzerland

No Drawing. Continuation-in-part of application Ser. No. 332,250, Dec. 20, 1963. This application Jan. 31, 1967, Ser. No. 612,824

10 Claims. (Cl. 260—2.5)

ABSTRACT OF THE DISCLOSURE

A method of rendering a polyester or polyether based polyurethane foam hydrophilic is set forth which comprises (1) reacting at a temperature of from about 70 to 110° C. in the presence of a catalyst selected from the group consisting of potassium hydroxide, sodium hydroxide, potassium chloride, potassium acetate, potassium phenolate, potassium methylate and potassium isopropylate (a) a polyether or polyester based polyurethane foam and (b) at least one carboxylic hydroxyacid lactone having the general formula

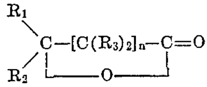

wherein $R_1$, $R_2$ and $R_3$ are selected from the group consisting of hydrogen, saturated alkyl radicals, unsaturated alkyl radicals, substituted aryl radicals and non-substituted aryl radicals, and wherein $n$ is an integer of 1 to 10, (2) cooling the foam, and (3) washing the foam.

This is a continuation-in-part of our application Ser. No. 332,250, filed Dec. 20, 1963, now abandoned, and the invention relates to a method of rendering hydrophilic a polyester or polyether based polyurethane foam and to the resulting products.

Alveolate foams are particularly suitable for the manufacture of sponges intended for industrial or domestic use. Open cell polyurethane foams, obtained by reacting a polyisocyanate either with a polyester or with a polyether, in most cases have the appearance of natural sponges. Their main drawback in relation with the latter or to regenerated cellulose sponges is that their water absorption capacity is very slight.

An object of the invention is to overcome this drawback of polyurethane foams. The invention accordingly provides a method of rendering hydrophilic a polyester or polyether based polyurethane foam, said method comprising:

(1) Reacting at a temperature of from about 70° C. to 110° C., in the presence of a catalyst selected from the group consisting of potassium hydroxide, sodium hydroxide, potassium chloride, potassium acetate, potassium phenolate, potassium methylate and potassium isopropylate, (a) a polyether or polyester based polyurethane foam, and (b) at least one carboxylic hydroxyacid lactone having the general formula:

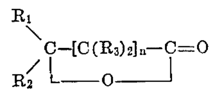

wherein $R_1$, and $R_2$ and $R_3$ are selected from the group consisting of hydrogen, saturated alkyl radicals, unsaturated alkyl radicals, substituted aryl radicals and non-substituted aryl radicals and wherein $n$ is an integer of 1 to 10, (2) Cooling said foam and (3) Washing said foam The method according to the invention thus consists in rendering polyurethane foam, or a sponge prepared from said foam, hydrophilic by adding hydrophilic molecules to the reactive groups of the foam, chemically fixing said molecules and lengthening the chain by polyaddition of said molecules. This may, for example, be achieved by impregnating the foam with a solution of the lactone and of the catalyst in an inert solvent, by then eliminating excess solution and by heating the impregnated foam at the desired temperature for the length of time required for the reaction.

It should be noted that the same meaning is given in this text to the phrases "polyurethane foam" and "polyurethane sponge."

Lactone of the above general formula may for example be beta-propiolactone or gamma-butyrolactone or a mixture thereof.

As regards the inert solvent, any one of the following solvents may be used: benzene, acetone, ortho-xylene, meta-xylene or a mixture thereof, tetra-hydronaphthalene and tetrachloromethane.

As for the temperature of the reaction, which can range from 70° to 110° C., the best results are achieved with a temperature of about 80° C.

It should be noted that the method according to the invention can be applied on any known polyether or polyester based polyurethane foam, the best results being obtained with open-cell, flexible foams. The methods of making the polyurethane foams or sponge to be treated form no part of the present invention and are well known and widely described in patents as well as other literature, for instance "German Plastics Practice" by De Bell et al., 1946.

The method may for example be carried out in the following manner:

Example 1

A polyether based open-cell polyurethane foam was made by mixing 100 parts of polypropylene-glycol with 105 parts of a mixture of 80 moles percent 2,4 tolylene diisocyanate and 20 moles percent 2,6 tolyene diisocyanate, 0.4 parts of stannous octoate, 1 part of silicone oil SF 1066, 0.2 part hexamethylene diamine and 3.6 parts water and then vigorously stirring the mixture for 15 seconds, pouring it into a mold wherein it foamed, the foam being complete after 10 minutes and then allowing to cure at 80° C. overnight. SF 1066 is a stable copolymer of a dimethylpolysiloxane and a polyoxyalkylene ether. The polyether based polyurethane foam (or a polyurethane sponge) obtained was impregnated with a mixture consisting of 100 ml. of a 2% solution of potassium isopropylate in isopropyl alcohol, 350 ml. of xylene and 350 ml. of beta-propiolactone. After elimination of excess solution, the impregnated foam was heated in an oven at a temperature of 80° C. for one hour. The foam was then left to cool and washed.

Example 2

The same procedure was adopted as in Example 1, but with a mixture consisting of 20 ml. of a 2% solution of potassium isopropylate in isopropyl alcohol, 70 ml. of beta-propiolactone and 630 ml. of xylene.

Example 3

The procedure was the same as in Example 1, but the mixture consisted of 150 ml. gamma-butyrolactone, 150 ml. of acetone and 50 ml. of a 2% solution of potassium isopropylate in isopropanol.

Example 4

100 parts of a polyester obtained from 1 mole of adipic acid and 1.2 moles of diethylene glycol were mixed with 3 parts of methyl-diethanolamine and 2 parts of water. Thereupon 35 parts of tolylene diisocyanate were added and the mixture stirred. After hardening an elastic odorless foamed product was obtained.

The polyester based polyurethane foam so obtained was impregnated as in the preceding examples but with a mixture of 100 ml. gamma-butyrolactone, 300 ml. of xylene and 30 ml. of a 2% solution of potassium isopropylate in isopropyl alcohol.

Example 5

As in Example 4, but with a mixture of 50 ml. of a 2% solution of potassium isopropylate in isopropyl alcohol, 100 ml. of beta-propiolactone and 300 ml. of tetrahydronaphtalene.

Example 6

As in Example 5, but by replacing the 300 ml. of tetrahydronaphtalene with 300 ml. of tetrachloromethane.

The method according to the invention may also be carried out in two stages. In the first stage, the foam is impregnated with a solution of the catalyst, the excess solution is eliminated and the foam is dried. In the second stage, the foam, upon which the catalyst has previously been deposited, is impregnated with a lactone solution and is heated after elimination of excess liquid. The washing is carried out after cooling as before.

By way of catalyst solvent, isopropanol may be used as in the above example, or else water or methanol.

The following examples illustrate the manner in which the method according to this two-stage version may be carried out.

Example 7

The same foam as in Example 1 is impregnated with a solution consisting of 200 ml. of water, 4 g. of potassium chloride and 200 ml. of isopropanol. The excess solution is eliminated and the impregnated foam is dried. The foam is again impregnated with a solution consisting of 200 ml. of xylene and 200 ml. of beta-propiolactone whereupon it is heated at a temperature of 80° C. for one hour after removal of excess solution. The foam then is allowed to cool and is washed.

Example 8

The procedure is the same as in Example 7, but by carrying out the first impregnation with a solution consisting of 380 ml. of water and 8 g. of potassium acetate, and the second impregnation with a solution consisting of 200 ml. of beta-propiolactone and 200 ml. of xylene.

Example 9

The procedure is the same as in Example 7, but by carrying out the first impregnation with a solution consisting of 2.3 g. of potassium hydroxide, 10 ml. of water and 400 ml. of isopropanol, and the second impregnation with a solution consisting of 200 ml. of xylene and 200 ml. of beta-propiolactone.

Example 10

The procedure is the same as in Example 7, but by carrying out the first impregnation with a mixture of 100 ml. of a 2% solution of potassium isopropylate in isopropyl alcohol and 700 ml. of isopropyl alcohol, and the second impregnation with a solution consisting of 400 ml. of xylene and 400 ml. of beta-propiolactone.

Example 11

As in Example 10, but by carrying out the second impregnation with a solution consisting of 600 ml. of xylene and 200 ml. of beta-propiolactone.

Example 12

As in Example 10, but by carrying out the second impregnation with a solution consisting of 80 ml. of beta-propiolactone and 720 ml. of ethyl ether.

Example 13

As in Example 10, but by carrying out the second impregnation with a solution consisting of 40 ml. of beta-propiolactone and 760 ml. of benzene.

It is to be noted that in the above examples the potassium isopropylate solution is prepared from metallic potassium which is caused to react with isopropyl alcohol.

The foams that have been treated according to the above examples exhibit remarkable hydrophilic properties. These have been checked by:

(1) A standard method which consists in determining the wetting time of a sponge, before and after the hydrophilization treatment. It has been observed that the wetting time of the sponge before treatment is about 5 minutes, whereas the wetting time of the same sponge, once treated, can be as low as 5 seconds.

(2) A standard method which consists in measuring the capillary rise of water in a foam, before and after hydrophilization treatment. This rise is nil in the case of the non-treated foam. It can exceed 100 g./dm.²/minute for the sponge when treated. This capillary rise is comparable to that obtained with a sponge of regenerated cellulose.

From the above examples, it is seen that the method is relatively fast, calls for no particular technique and can be carried out continuously. The degree of hydrophilization depends of course on the concentration of the lactone in the solution with which the foam is impregnated. A hydrophilic foam can already be obtained with a 1% concentration of lactone. The degree of hydrophilization is set at the start depending on the use to which the sponges are to be put.

The invention also provides a modified polyester or polyether based polyurethane foam which exhibits improved hydrophilic properties as compared to the unmodified foam, comprising polyester or polyether based polyurethane foams having molecules of at least one lactone chemically bonded in situ on to the reactive groups of the foam.

As it is known, polyurethane foam, either polyester or polyether based, comprise as main structural unit, the urethane group.

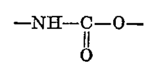

The urethane group are capable of being added to the lactone molecule through the hydrogen atom.

The hydrophilic polyester or polyether based polyurethane foam produced by the process according the invention comprises lateral chains, obtained by polyaddition of lactone molecule on the urethane group. These lateral chains which impart high hydrophilic properties to the foam, can be either acid terminated or alcohol terminated, according to the following general formulae:

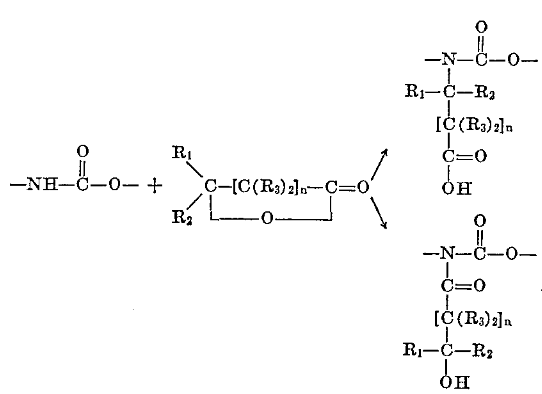

where $R_1$, $R_2$, $R_3$ and $n$ have the same meaning as above.

We claim:

1. A method of rendering hydrophilic a polyester or polyether based polyurethane foam comprising:

(1) reacting at a temperature of from about 70 to 110° C. in the presence of a catalyst selected from the group consisting of potassium hydroxide, sodium hydroxide, potassium chloride, potassium acetate, potassium phenolate, potassium methylate and potassium isopropylate, (a) a polyether or polyester based polyurethane foam, and (b) at least one carboxylic hydroxyacid lactone having the general formula

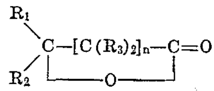

wherein $R_1$, $R_2$, and $R_3$ are selected from the group consisting of hydrogen, saturated alkyl radicals, unsaturated alkyl radicals, substituted aryl radicals and non-substituted aryl radicals, and wherein $n$ is an integer of 1 to 10, (2) cooling said foam, and (3) washing said foam 2. The hydrophilic foam produced by the process of claim 1.

3. The method as defined in claim 1, wherein the reaction (1) is carried out a temperature of about 80° C.

4. The method as defined in claim 1, wherein said lactone (b) includes beta-propiolactone.

5. The method as defined in claim 1, where said lactone (b) includes gamma-butyrolactone.

6. The method as defined in claim 1, wherein, prior to the reaction (1) said foam is impregnated with a solution comprising said lactone (b), said catalyst, and at least one inert solvent.

7. The method as defined in claim 6, wherein said inert solvent consists of at least one of the group consisting of ortho-xylene, para-xylene, meta-xylene a mixture of ortho-, para-, and meta-xylene, tetrahydro-naphthalene, tetrachloromethane, acetone, benzene and ether.

8. The method as defined in claim 1, wherein, prior to said reaction (1), (i) said foam is initially contacted with a first solution comprising said catalyst and a solvent for said catalyst, (ii) the excess solvent is thereafter eliminated from said foam, (iii) said foam is then dried, and (iv) thereafter said foam is impregnated with a second solution comprising said lactone (b) and a solvent inert to said foam.

9. The method as defined in claim 8, wherein said catalyst solvent in said first solution consists of at least one of the group consisting of water, isopropanol and methanol.

10. The method as defined in claim 8, wherein said inert solvent in said second solution consists of at least one of the group consisting of orthoxylene, meta-xylene, a mixture of ortho-, para- and meta-xylene, tetrahydronaphthalene, tetrachloromethane, acetone, benzene and ether.

References Cited

UNITED STATES PATENTS

| | | | |
|---|---|---|---|
| 2,920,983 | 1/1960 | Bugosh | 117—98 |
| 2,965,584 | 12/1960 | Elkin | 260—2.5 |
| 2,990,378 | 6/1961 | Hurwitz et al. | 260—2.5 |
| 2,990,379 | 6/1961 | Young et al. | 260—2.5 |
| 3,149,000 | 9/1964 | Beicos | 117—98 |
| 3.169,945 | 2/1965 | Hostettler et al. | 260—78.3 |
| 3,186,971 | 6/1965 | Hostettler et al. | 260—77.5 |

FOREIGN PATENTS

| | | |
|---|---|---|
| 411,336 | 11/1966 | Switzerland. |
| 417,084 | 1/1967 | Switzerland. |
| 924,081 | 4/1963 | Great Britain. |
| 1,394,765 | 3/1965 | France. |
| 1,399,243 | 4/1965 | France. |

DONALD E. CZAJA, *Primary Examiner.*

F. McKELVEY, *Assistant Examiner.*